(12) United States Patent
Lee (10) Patent No.: US 7,836,040 B2
(45) Date of Patent: Nov. 16, 2010

(54) METHOD AND SYSTEM FOR CREATING SEARCH RESULT LIST

(75) Inventor: Woosung Lee, Seoul (KR)

(73) Assignee: NHN Business Platform Corporation, Seongnam-si (KR)

( * ) Notice: Subject to any disclaimer, the term of this patent is extended or adjusted under 35 U.S.C. 154(b) by 346 days.

(21) Appl. No.: 11/737,822

(22) Filed: Apr. 20, 2007

(65) Prior Publication Data
US 2007/0250488 A1 Oct. 25, 2007

(30) Foreign Application Priority Data
Apr. 21, 2006 (KR) .................. 10-2006-0036234

(51) Int. Cl.
*G06F 17/30* (2006.01)
(52) U.S. Cl. .................. 707/706; 707/708; 707/710; 707/723
(58) Field of Classification Search .......... 707/1–7, 707/104.1; 705/10, 14, 26
See application file for complete search history.

(56) References Cited

U.S. PATENT DOCUMENTS

| 6,978,263 | B2 | 12/2005 | Soulanille | |
|---|---|---|---|---|
| 6,983,272 | B2 | 1/2006 | Davis et al. | |
| 7,020,622 | B1 * | 3/2006 | Messer | 705/26 |
| 7,054,857 | B2 | 5/2006 | Cunningham et al. | |
| 7,444,358 | B2 * | 10/2008 | Paczkowski et al. | 707/104.1 |
| 7,447,678 | B2 * | 11/2008 | Taylor et al. | 707/3 |
| 2003/0033292 | A1 * | 2/2003 | Meisel et al. | 707/3 |
| 2003/0149622 | A1 * | 8/2003 | Singh et al. | 705/14 |
| 2004/0039733 | A1 * | 2/2004 | Soulanille | 707/3 |
| 2007/0027743 | A1 * | 2/2007 | Carson et al. | 705/10 |
| 2007/0100795 | A1 * | 5/2007 | Davies | 707/3 |
| 2007/0112840 | A1 * | 5/2007 | Carson et al. | 707/102 |

FOREIGN PATENT DOCUMENTS

| KR | 1020030051577 A | 6/2003 |
|---|---|---|
| KR | 1020040053728 A | 6/2004 |
| KR | 10-0492075 B | 5/2005 |
| KR | 1020060017904 A | 2/2006 |

OTHER PUBLICATIONS

Research on Overture-Advertisement Retrieval Type Services, Person Who Dominates Search Engine Dominates Market Mar. 25, 2003, pp. 24-30, (vol. 4, No. 4).
Exploit Google Ads for E-Commerce, Person Who Dominates Search Enginge Dominates Market, Feb. 25, 2003, pp. 24-30, (vol. 4, No. 3).

* cited by examiner

*Primary Examiner*—Hung T Vy
*Assistant Examiner*—Hanh B Thai
(74) *Attorney, Agent, or Firm*—Husch Blackwell LLP (57) ABSTRACT

A method and system for creating a search result list, which can simplify a system configuration by searching a single database for search information, and also can display search information on a plurality of display areas with only one keyword purchase. According to the present invention, there may be provided a method and system for creating a search result list, which can differ from a conventional method and system of providing an individual database for each of display areas and thereby effectively managing search information, and can enroll a keyword in a single database according to one keyword purchase and thereby display search information on a plurality of display areas.

12 Claims, 6 Drawing Sheets

FIG. 1

| FLOWER DELIVERY | SEARCH |

POWER LINK 100 flower delivery flower mall – delivers flower anywhere within 2 hours...
http://www.flowermall.co.kr
recommendation flower delivery – brand flower delivery...
http://www.mbcflower.co.kr
flower119 flower delivery – professional flower delivery driver...
http://www.flower119.co.kr

PLUS PRO 110

SALE 20%  love flower delivery nymph & wood gatherer
– discount flower delivery service...
http://www.angelwood.co.kr
⋮

BEADS SITE 120 green topia – flower delivery anywhere...
service – issues receipt...
http://www.green-topia.co.kr
joa flower delivery – free flower box delivery ...
event – gift...
http://www.joaflower.com
Korea flower net – various products, 20% discount...
service – digital camera...
http://www.2002flower.net
flower angle – wreath...
service – delivery within 2 hours...
http://www.songflower.co.kr
AM flower delivery – 100 roses...
guide – song flower delivery...
http://www.amflower.co.kr
seven flower – cheap but elegant flower delivery...
service – song flower delivery...
http://www.sevenflower.co.kr
⋮

<KEYWORD 'FLOWER DELIVERY'>

| SEARCH INFORMATION | MAXIMUM CLICK COST | ADVERTISING MANAGEMENT POINT | CCI SIZE | RANKING |
|---|---|---|---|---|
| • FLOWER DELIVERY FLOWER MALL | 150 | 5 | 750 | 1 |
| • RECOMMENDATION FLOWER DELIVERY | 120 | 5 | 600 | 2 |
| • FLOWER119 FLOWER DELIVERY | 120 | 4 | 480 | 3 |
| • GREEN TOPIA | 110 | 4 | 440 | 4 |
| • JOA FLOWER DELIVERY | 110 | 3 | 330 | 5 |
| • KOREA FLOWER NET | 100 | 3 | 300 | 6 |
| • FLOWER ANGEL | 90 | 3 | 270 | 7 |
| • AM FLOWER DELIVERY | 85 | 3 | 55 | 8 |
| • SEVEN FLOWER | 85 | 2 | 170 | 9 |
| ... | ... | ... | ... | ... |

FIG. 4

AREA GROUP I (TOP THREE)

- FLOWER DELIVERY FLOWER MALL
- RECOMMENDATION FLOWER DELIVERY
- FLOWER119 FLOWER DELIVERY

AREA GROUP II (FROM FOURTH PLACE)

- GREEN TOPIA
- JOA FLOWER DELIVERY
- KOREA FLOWER NET
- FLOWER ANGEL
- AM FLOWER DELIVERY
- SEVEN FLOWER
  - ○
  - ○
  - ○

FIG. 5

FIG. 6

METHOD AND SYSTEM FOR CREATING SEARCH RESULT LIST

CROSS-REFERENCE TO RELATED APPLICATION

This application claims the benefit of Korean Patent Application No. 10-2006-0036234, filed on Apr. 21, 2006, in the Korean Intellectual Property Office, the disclosure of which is incorporated herein by reference.

BACKGROUND OF THE INVENTION

1. Field of the Invention

The present invention relates to a method and system for creating a search result list, which can simplify a system configuration by searching a single database for search information, and also can display search information on a plurality of display areas with only one keyword purchase.

2. Description of Related Art

With developments in the Internet, information search using a network is currently popular among users. Also, since information search using the network is actively utilized, an advertiser utilizes a keyword advertising model, as a valid advertising technique, which can provide advertising associated with a keyword by inserting the advertising into a search result view or combining the advertising and search information. In this instance, keyword advertising becomes a stable income source for an information search supporting company, for example, a search site operator.

Conventional keyword advertising provides various display areas for keyword advertising depending upon a form of information included in an advertiser's search information, a form of charging the advertiser with an advertising fee, and the like. Specifically, search information including advertising information may be retrieved via a search operation and the retrieved search information may be displayed on a display area of the keyword advertising. Also, a search result list including the retrieved search information may be displayed on the display area.

A system for providing the conventional keyword advertising includes an independent database, managing search information, for display areas. Accordingly, a process of constructing equipment is complex, and a construction cost also significantly increases.

Specifically, when it is necessary to independently manage search information with respect to a plurality of display areas, a server supporting keyword advertising includes an independent database with respect to each of the display areas.

Accordingly, an advertiser, which purchases search information for keyword advertising, may feel burdened to repeatedly purchase one identical keyword for each display area to display search information on each of the display areas. Also, the advertiser must separately manage the keyword which is purchased for each display area.

Also, a site operator supporting keyword advertising may be required to make additional efforts, for example, business, marketing, and the like, since a separate database must be provided for each display area.

Accordingly, there is a need for a new keyword advertising model capable of retrieving search information to be displayed on a plurality of display areas using a single database, without an individual database for each of the plurality of display areas, and displaying search information while actively moving from a display area to another display area according to a marketing strategy, with only one keyword purchase.

BRIEF SUMMARY

An aspect of the present invention provides a method and system for creating a search result list, which differs from a conventional method and system of providing an individual database for each display area and thereby effectively managing search information, and can enroll a keyword in a single database according to one keyword purchase and thereby display search information on a plurality of display areas.

Another aspect of the present invention also provides a method and system for creating a search result list, which can display an advertiser's search information on a plurality of display areas while organically changing the plurality of display areas, and thereby enable the advertiser to effectively display and manage the search information according to a marketing strategy.

Another aspect of the present invention also provides a method and system for creating a search result list, which can reduce system configuration/maintenance cost since a keyword advertising provider does not need to provide a separate database for each display area, and also does not need additional efforts, such as business and marketing, for each display area.

Another aspect of the present invention also provides a method and system for creating a search result list, which can display a plurality of search result lists on a plurality of display areas respectively, and thereby enable a searcher to readily access various types of search information and also give an advertiser more opportunities to display search information via one keyword purchase.

Another aspect of the present invention also provides a method and system for creating a search result list, which can combine display areas, for example, 'power link' and 'beads site', into a single system and thereby improve a convenience in a keyword enrollment and enable a common utilization of a database.

Another aspect of the present invention also provides a method and system for creating a search result list, which can put one display rule in an upper display area and another display rule in a lower display area, and thereby encourage healthy competition among companies, and sort search information by appropriately mixing a paid listing rule and a paid inclusion rule.

According to an aspect of the present invention, there is provided a method of creating a search result list, the method including the steps of: maintaining a database, the database storing search information in association with at least one keyword, each search information being associated with an advertiser, the search information including a search result list and a rank index information wherein the rank index information is determined based, at least, upon a bid amount received from an advertiser; searching the database for search information corresponding to a keyword in response to a search request received from a searcher; identifying search information having keywords generating a match with the search request; classifying at least one of the identified search information into one of a plurality of area groups by using the rank index information; creating a search result list by arranging the classified search information for display as the search result list according to a predetermined rule; and displaying the search result list in response to the search request, the search result list including at least one search listing of the sorted search information, wherein each of the plurality of area groups are displayed separately from each other.

According to another aspect of the present invention, there is provided a system for creating a search result list, the system including: a database for storing search information in association with at least one keyword, each search information being associated with an advertiser, the search information including a search result list and a rank index information wherein the rank index information is determined based, at least, upon a bid amount received from an advertiser; a search component configured to search the database for search information of a keyword corresponding to a keyword in response to a search request received from a searcher; a group classifier configured to classify at least one of the searched search information into one of a plurality of area groups by using the rank index information; and a list creator configured to create the search result list by arranging the classified search information for display as the search result list according to a predetermined rule.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a module. One or more components can reside within a process and/or thread of execution, and a module or component can be localized on one computer and/or distributed between two or more computers.

As used herein, the terms "desktop," "PC," "local computer," and the like, refer to computers on which systems (and methods) according to the invention operate. In the illustrated embodiments, these are personal computers, such as portable computers and desktop computers; however, in other embodiments, they may be other types of computing devices (e.g., workstations, mainframes, personal digital assistants or PDAs, music or MP3 players, and the like).

Figure 1:
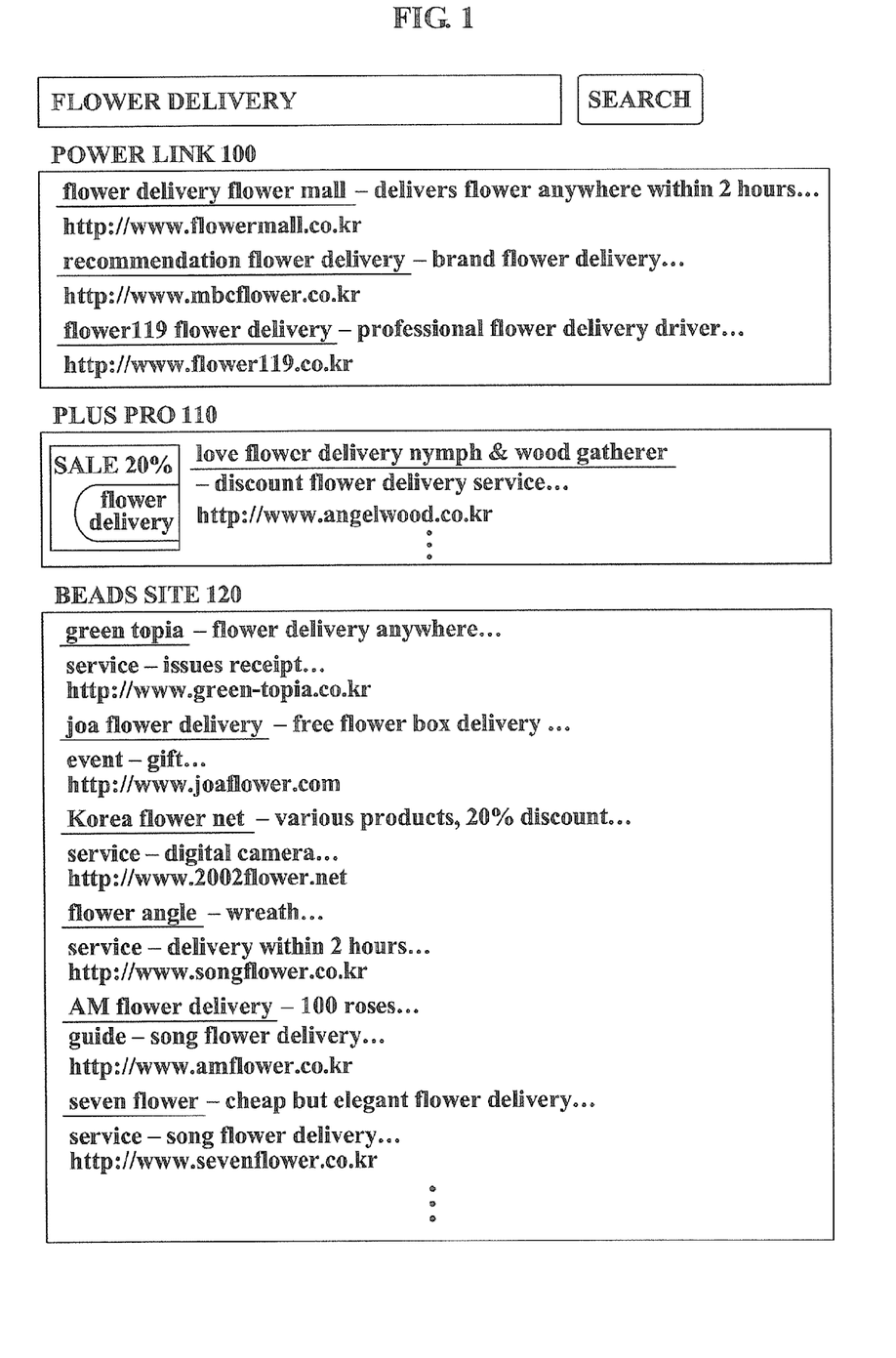
FIG. 1 illustrates a search result view using a method of creating a search result list according to an exemplary embodiment of the present invention.

FIG. 1 illustrates a search result view using a method of creating a search result list according to an exemplary embodiment of the present invention.

As shown in FIG. 1, when a searcher enters a keyword 'flower delivery', i.e. a search keyword, in a search window supporting a search operation, a search result list creating system according to the present invention retrieves search information of an advertiser which purchased the keyword 'flower delivery', classifies the retrieved search information into any one of a plurality of area groups according to a predetermined criterion, and creates a plurality of search result lists by sorting the search information according to an independent sorting rule with respect to each of the area groups. In this instance, the search result list creating system may display the plurality of search result lists on a plurality of display areas respectively, so that the searcher may readily access more various and acceptable search information and the advertiser may have more opportunities to display a search listing in association with the search information with only one keyword purchase.

The plurality of display areas is generated by dividing the search result view into a plurality of areas. In this instance, the search result list is displayed on the display area. Search information, which is classified into the same area group and sorted, is generated as a list and displayed on a particular display area. An example of the display area includes a power link 100, a plus pro 110, and a beads site 120 shown in FIG. 1. The search listing in association with the identified search information corresponding to the keyword 'flower delivery' may be displayed on a different display area according to a contract type of keyword advertising, a configuration of search information, and the like. For example, search information including a search listing may be displayed to the searcher via the display area 'plus pro 110'. The display area 'plus pro 110' sorts and displays the search listing including a description and an image of a website of an advertiser.

Unlike a conventional system of including an individual database, managing search information, for each display area, the search result list creating system retrieves search information to be displayed on a plurality of display areas, using only one database. Accordingly, it is possible to simplify a system configuration and display search listings in a plurality of display areas with one keyword purchase.

For example, with respect to the display areas, power link 100 and beads site 120, which have a different sorting/payment rule in association with search information, the search result list creating system may associate only a single database with both display areas. Through the above operation, search information is retrieved from the single database in response to the search keyword 'flower delivery'. The retrieved search information is classified into any one of the power link 110 and the beads site 120, and is sorted therein.

Also, the search result list creating system may enable each display area to maintain the sorting/payment rule of a corresponding display area. Accordingly, it is possible to guarantee effects which may be acquired by displaying the search listings associated with the search information on a particular display area. Specifically, the search result list creating system may readily manage search information by using a single database for keyword advertising, while setting an independent sorting/payment rule for each display area.

For example, the search result list creating system may classify search information, which is retrieved corresponding to the keyword 'flower delivery', into any one of an area group I and an area group II according to a rank index information, for example, a click choice index (CCI) size. Also, the search result list creating system may create a search result list by sorting the search information classified into the area group I according to a fixed-type sorting rule which is a sorting rule of the power link 100. Also, the search result list creating system may create a search result list by sorting the search information classified into the area group II according to a sorting algorithm which is a sorting rule of the beads site 120. The created search result lists may be displayed on the display areas allocated to the area groups I and II respectively, so that the search listing associated with the search information may be displayed to the searcher.

The power link 100 corresponds to a display area where search information including a website title and a website description with a network address is sorted and displayed. For example, the search information classified into the area group I may be sorted according to the CCI size and displayed. FIG. 1 illustrates a search result list, which is created by classifying search information 'flower delivery mall', 'recommendation flower delivery', and 'flower 119 flower delivery' having the CCI size within the top three, among search information retrieved corresponding to the keyword 'flower delivery', into the area group I, and sorting the three search information classified into the area group I according to the CCI size. Another example of the search information sorting rule of the power link 100 may include a rolling-type sorting rule. In this instance, the search result list creating system may create a search result list by randomly sorting the three search information classified into the area group I, and display the created search result list on the display area power link 100.

The beads site 120 corresponds to a display area where a search listing associated with search information including a website title, a website description with a network address, and additional information, such as a service, an event, and the like, are sorted and displayed. For example, the search information classified into the area group II may be sorted randomly or according to a predetermined sorting algorithm, and displayed. In this instance, the sorting algorithm is to analyze data, which is created in association with particular search information during a period of time, and determine a location of the search listing in the search result list. For example, the sorting algorithm may be created by including a popularity of the search information over a previous 30 days, or a relation between the search information and the keyword. In this instance, the popularity may include a number of clicks of searchers, and the like. Also, the relation may include whether a search keyword includes search information.

Referring again to FIG. 1, a search result list is created by classifying a plurality of search information 'green topia', 'joa flower delivery', 'Korea flower net', and the like, from a fourth place, excluding the top three among the retrieved search information, into the area group II, and sorting the search information classified into the area group II randomly or according to the sorting algorithm.

A click per cost (CPC) rule may be utilized to charge an advertiser with an advertising fee. The CPC rule charges a predetermined amount of money every time a searcher clicks displayed search listing. In the present exemplary embodiment, the advertising fee may be calculated by using a bid amount, such as the maximum click cost, entered from the advertiser. When calculating the advertising fee, the search result list creating system may calculate the maximum click cost, entered from the advertiser of search information, as the advertising fee as is, every time the searcher clicks the search listing. Also, the search result list creating system may calculate the advertising fee by applying a predetermined weight to the maximum click cost.

In the present exemplary embodiment, the advertising fee is calculated by using the maximum click cost, however, the present invention is not limited thereto. It is possible to calculate an advertising fee for each search information by using a CCI size. For example, the search result list creating system may identify search information with a smallest CCI size from the entire search information classified into a particular area group, and calculate the advertising fee, 200/5=40, by dividing the CCI size, for example, 200, of the identified search information by individual management points, for example, 5, of each search information.

Accordingly, a method of creating a search result list may differ from a conventional method of providing an individual database for each of display areas, for example, 'power link' and 'beads site', and thereby effectively managing search information, and may enroll a keyword in a single database according to a single keyword purchase and thereby display the search listings on a plurality of display areas.

Also, according to the present invention, it is possible to display an advertisers' search listings on a plurality of display areas while organically changing the plurality of display areas, for example, power link and beads site, and thereby enable the advertiser to effectively display and manage the search information according to a marketing strategy.

Also, according to the present invention, it is possible to determine a location of a search listing in a search result list according to a predetermined algorithm considering various elements, and thereby solve a problem, such as an increase in an advertising fee, which occurs from a conventional method of determining a search listing location using only a maximum click cost.

Also, according to the present invention, it is possible to reduce system configuration/maintenance cost since a keyword advertising provider does not need to provide a database for each display area, and also does not need additional efforts, such as business and marketing, for each display area.

Hereinafter, a configuration of a search result list creating system according to an exemplary embodiment of the present invention will be described with reference to FIG. 2.

Figure 2:
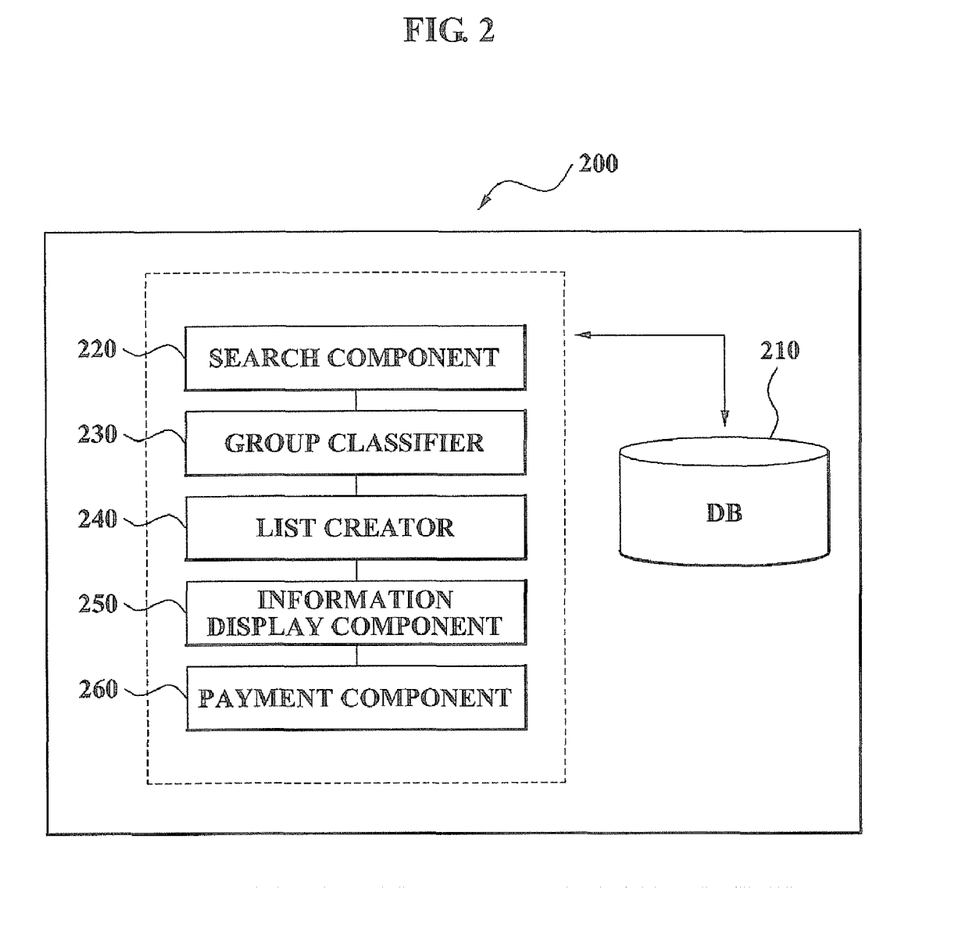
FIG. 2 is a block diagram illustrating a configuration of a search result list creating system according to an exemplary embodiment of the present invention.

FIG. 2 is a block diagram illustrating a configuration of a search result list creating system 200 according to an exemplary embodiment of the present invention.

The search result list creating system 200 may include a database 210, a search component 220, a group classifier 230, and a list creator 240.

The database 210 stores search information in association with a keyword. In this instance, the search information includes CCI information and a search listing. Specifically, the database 210 functions to receive search information and a keyword from an advertiser which desires to utilize a keyword advertising service, and store and maintain the search information and the keyword. In this instance, the keyword causes the search information to be extracted. When a search request is received, the keyword triggers a search. Also, the keyword and the search information correspond to each other. When inputting the search information, the advertiser may input the keyword through a keyword purchase process, and store the keyword and the search information to correspond to each other. Through the above process, when the searcher enters a search keyword into a search window for a later search, the search result list creating system 200 may search the database 210 for information of the keyword corresponding to the received search keyword.

The database 210 may store a maximum click cost entered from the advertiser, to correspond to the search information. In this instance, when the searcher clicks the displayed search listing, the maximum click cost may indicate a maximum amount allowed for payment. The advertiser may arbitrarily enter the maximum click cost according to a marketing strategy.

When entering the maximum click cost, the search result list creating system 200 may determine an available price range for each keyword category. Also, the search result list creating system 200 may induce the advertiser to input the maximum click cost within the available price range which is determined for a keyword category of the keyword. Through the above process, the search result list creating system 200 may maintain a price of a keyword purchased for each category to a certain level. For example, the search result list creating system 200 may appropriately guarantee the benefits of a system operator by preventing the advertiser from entering the maximum click cost at an extremely low price for a category including popular keywords.

Also, the bid amount, such as the maximum click cost, may be utilized to create CCI information which is used to determine a ranking of the search information. Hereinafter, a calculation of the CCI size for each search information will be described with reference to FIG. 3.

Figure 3:
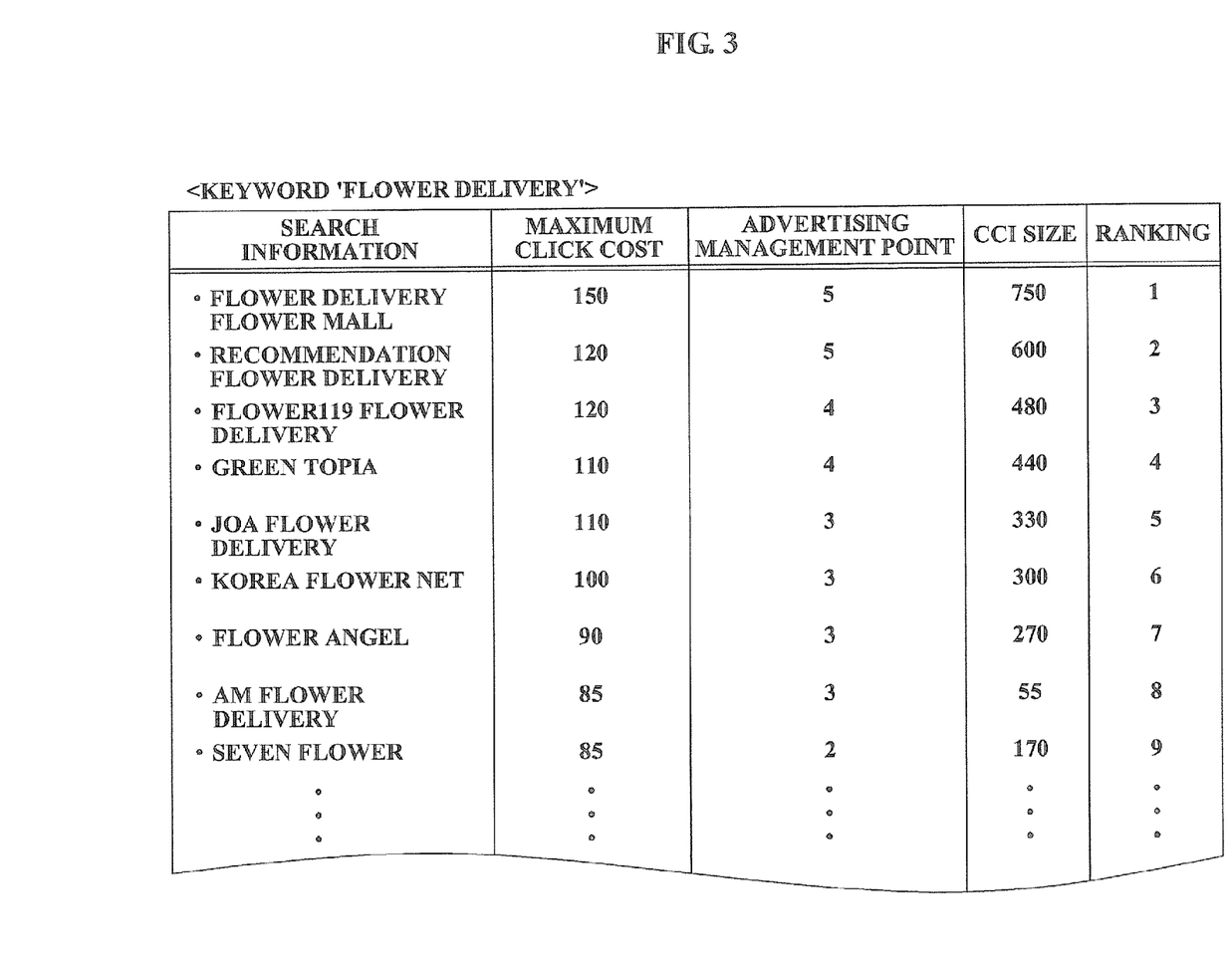
FIG. 3 illustrates an example of creating CCI information with respect to each search information according to an exemplary embodiment of the present invention.

FIG. 3 illustrates an example of creating CCI information with respect to each search information according to an exemplary embodiment of the present invention.

Referring to FIG. 3, the database 210 of FIG. 2 stores a maximum click cost to correspond to each of search information. In this instance, the maximum click cost is entered by each of advertisers which purchased a keyword 'flower delivery' together. CCI indicates a point which is applied according to operational results of particular search information accomplished during a keyword advertising service period. For example, the CCI may be represented as a numerical value which is acquired by multiplying the maximum click cost by an advertising management point. A search result list creating system may retrieve a predetermined number of search information corresponding to a keyword in an order of a greater CCI size. A greater maximum click cost should be entered and a greater advertising management point should be acquired, so that search information may be retrieved at greater probability. However, since the advertiser may not arbitrarily adjust the advertising management point, the advertiser should enter a greater maximum click cost to increase the CCI size.

In this instance, the advertising management point indicates a point which an operator of the present system sets for each search information according to operational results of search information during a predetermined period of time. For example, the operator may change the operational results into a numerical value by considering at least one of an average click rate and a click through rate (CTR) for a previous 30 days with respect to the search listing. In this instance, the average click rate is calculated by dividing the number of clicks by the number of displays.

For example, with respect to search information 'flower delivery flower mall' of an advertiser which enters a maximum click cost '150', the operator may set advertising management point to '5' by considering the operational results, such as the average click rate. The search result list creating system 200 may calculate the CCI size as '750' by multiplying the maximum click cost '150' and the advertising management point '5'.

Also, the search result list creating system 200 creates CCI information including the calculated CCI size, and associates the CCI information with search information.

Also, the search result list creating system 200 may determine a ranking of search information according to the calculated CCI size. Referring to FIG. 3, a comparatively higher ranking is assigned to search information with a greater CCI size. The assigned ranking may be utilized when the group classifier 230 classifies the search information into a particular area group.

For example, the database 210 of FIG. 2 stores search information of advertisers, which purchased the keyword 'flower delivery' together, by sorting the search information, and the database 210 assigns a first place to search information 'flower delivery flower mall' with the greatest CCI size '750', and assigns a ranking to remaining search information according to a descending series based on the CCI size.

The search component 220 searches the database 210 for search information of a keyword corresponding to a search keyword, when the search keyword is received. Specifically, the search component 220 functions to extract search information corresponding to the search keyword, from the database 210, in response to a search request generated when a searcher enters the search keyword. Also, the search component 210 may identify a keyword, which exactly matches the search keyword or includes the search keyword, from the database 210 and search the database 210 for search information corresponding to the identified keyword.

The group classifier 230 classifies the retrieved search information into any one of a plurality of area groups by using the CCI information. Specifically, the group classifier 230 determines a ranking of each search information according to a CCI size included in the CCI information, and classifies search information within a predetermined ranking range, into a first area group. Also, the group classifier 230 classifies search information out of the predetermined ranking range into a second area group. In this instance, the second area group is different from the first area group. The first area group and the second area group may be utilized to identify a display area for displaying the search listing and to group the search listing. In the present exemplary embodiment, the first area group may classify search information to be displayed on an upper display area of a search result view, and the second area group may classify search information to be displayed in a comparatively lower display area than the search information classified into the first area group. In this instance, the first area group and the second area group are used for convenience of description. The group classifier 230 may classify the retrieved search information into at least two area groups.

The list creator 240 creates the search result list by sorting the classified search information according to a predetermined sorting rule. Specifically, the list creator 240 sorts search information classified into one particular area group according to an independent sorting rule, and creates a list of the sorted search information.

When a fixed-type sorting rule is determined as the sorting rule with respect to at least one of the first area group and the second area group, the list creator 240 may create the search result list by sorting the search information, classified into the first area group or the second area group, according to a descending series based on the CCI size.

Also, when a rolling type sorting rule is determined as the sorting rule with respect to at least one of the first area group and the second area group, the list creator 240 may create the search result list by randomly sorting the search information, classified into the first area group or the second area group.

Specifically, with respect to the second area group (or the first area group) of the present exemplary embodiment, which classifies search information to be displayed on the comparatively lower display area than the search information classified into the first area group, the list creator 240 may select a sorting algorithm utilization rule as the sorting rule. In this case, the list creator 240 may create the search result list by sorting the search information classified into the second area group according to the sorting algorithm. In this instance, the sorting algorithm sorts search information by reflecting various factors which are cumulatively generated by operating keyword advertising. For example, the sorting algorithm may be created by considering at least one of a popularity of the search information and a relation between the search information and the keyword. For example, when applying the sorting algorithm associated with the popularity, the list creator 240 may determine a location of particular search information in the search result list by considering the popularity of the search information over a predetermined period of time for which the search information is displayed to the searcher.

As described above, according to the present invention, it is possible to provide an environment where search information may be variously displayed to a searcher by classifying search information into a predetermined area group according to a display area, and sorting the search information according to an independent rule for the classified area group, and thereby creating a plurality of search result lists.

Also, according to the present invention, it is possible to display the search listings on a plurality of display areas according to one keyword purchase. Accordingly, an advertiser may have more opportunities to display the search listing of the advertiser.

Hereinafter, an example of creating a search result list will be described with reference to FIGS. 3 and 4.

Figure 4:
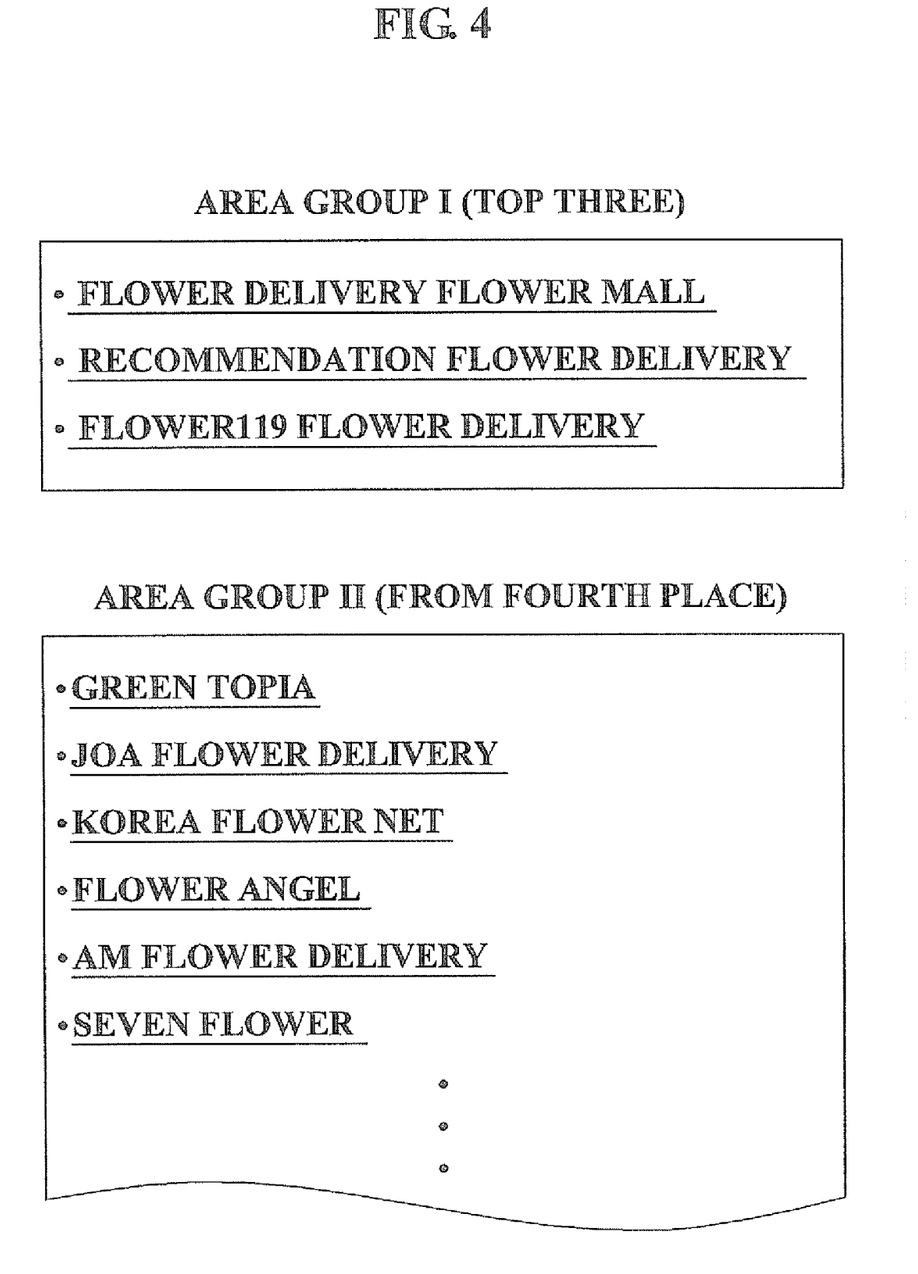
FIG. 4 illustrates an example of a search result list created for each area group according to an exemplary embodiment of the present invention.

FIG. 4 illustrates an example of a search result list created for each area group according to an exemplary embodiment of the present invention.

As described above with reference to FIG. 3, the search result list creating system 200 determines a ranking of search information by considering the CCI size. In this instance, the search information is stored in the database 210 of FIG. 3 corresponding to the keyword 'flower delivery'. In this instance, the CCI size is acquired by multiplying the maximum click cost and the advertising management point. Specifically, in the database 210, search information 'flower delivery flower mall' is assigned with a first place since the search information has the greatest CCI size '750', and remaining search information is assigned with a ranking according to a descending series based on the CCI size.

In this circumstance, the search result list creating system 200 may classify search information within a predetermined ranking range into an independent area group. Referring to FIG. 4, when the predetermined ranking range is set to 'top three', the search result list creating system 200 classifies search information 'flower delivery flower mall', 'recommendation flower delivery', and 'flower119 flower delivery' within top three, i.e. a first place, a second place, and a third place, into an area group I, and classifies a plurality of search information, 'green topia', 'joa flower delivery', 'Korea flower net', and the like, out of top three, into an area group II.

In this instance, the search result list creating system 200 may create the search result list by sorting the search information classified into the area group I according to the CCI size or by randomly rolling the search information. Also, the search result list creating system 200 may create the search result list by randomly rolling the search information classified into the area group II or by sorting the search information according to the sorting algorithm.

Referring to FIG. 4, the search result list creating system 200 creates a search result list in which the search information 'flower delivery flower mall', 'recommendation flower delivery', and 'flower119 flower delivery', classified into the area group I, are sequentially sorted according to the CCI size. Also, the search result list creating system 200 applies the sorting algorithm to the search information classified into the area group II, and thereby creates a search result list in which the plurality of search information, 'green topia', 'joa flower delivery', 'Korea flower net', and the like, are sequentially sorted according to the sorting algorithm.

The search result list created for the area group I may be displayed to the searcher on the upper display area, and the search result list created for the area group II may be displayed to the searcher on the comparatively lower display area than the search result list of the area group I.

For the above operation, the search result list creating system 200 may further include an information display component 250. The information display component 250 functions to simultaneously display a plurality of search result lists on a plurality of display areas allocated to a plurality of area groups respectively. In this instance, the plurality of search result lists is created for each area group. In the above described example, the information display component 250 may display two search result lists, which are created in response to the search keyword 'flower delivery', to the display area 'power link' allocated to the area group I and the display area 'beads site' allocated to the area group II respectively, as shown in FIG. 1.

When a searcher clicks a search listing of the search result list, the search result list creating system 200 may further include a payment component 260 to charge an advertiser of the search listing with an advertising fee. Specifically, in the present exemplary embodiment, the payment component 260 adopts a CPC rule which pays an advertising fee every time the searcher clicks the search listing. Accordingly, the advertiser may pay only the advertising fee corresponding to acquired advertising effects.

In this instance, an example of retrieving search information in real time when a searcher enters a search keyword, and providing the searcher with a plurality of search result lists, which are created by using the retrieved search information, has been described above, however, the present invention is not limited thereto. Specifically, various types of embodiments may be provided, for example, an embodiment of pre-creating a plurality of search result lists for each keyword, retrieving a search result list in response to a search keyword from a searcher, and providing the searcher with the retrieved search result list, and the like.

Accordingly, a method of creating a search result list may differ from a conventional method of providing an individual database for each of display areas and thereby effectively managing search information, and may enroll a keyword in a single database according to one keyword purchase and thereby display the search listing on a plurality of display areas.

Also, according to the present invention, it is possible to display an advertiser's search listing on a plurality of display areas while organically changing the plurality of display areas and thereby enable the advertiser to effectively display and manage the search information according to a marketing strategy.

Also, according to the present invention, it is possible to determine a location of search listing in a search result list according to a predetermined algorithm considering various elements, and thereby solve a problem, such as an increase in an advertising fee, which occurs from a conventional search listing location determining method using only a maximum click cost.

Also, according to the present invention, it is possible to reduce system configuration/maintenance cost since a keyword advertising provider does not need to provide a database for each display area, and also does not need additional efforts, such as business or marketing, for each display area.

Hereinafter, an operational flow of a search result list creating system according to an exemplary embodiment of the present invention will be described in detail.

Figure 5:
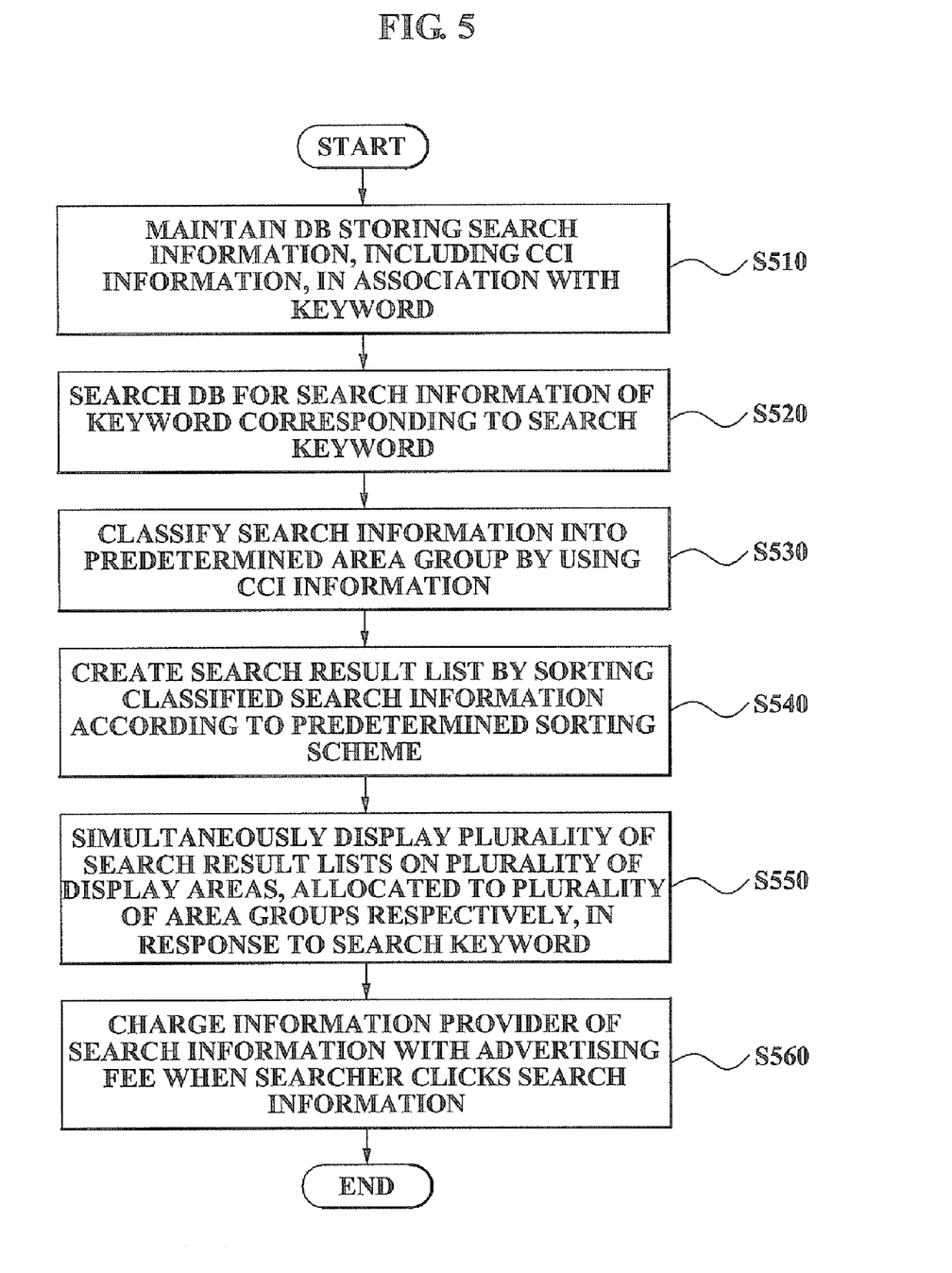
FIG. 5 is a flowchart illustrating a method of creating a search result list using a point distribution according to an exemplary embodiment of the present invention.

FIG. 5 is a flowchart illustrating a method of creating a search result list using a point distribution according to an exemplary embodiment of the present invention.

The method of creating a search result list is performed by the search result list creating system 200 described above.

In operation S510, the search result list creating system 200 maintains the database 210 storing search information in association with a keyword. In this instance, the search information includes CCI information and a search listing. Operation S510 is a process of receiving search information and a keyword from an advertiser which desires to utilize a keyword advertising service. In this instance, the keyword causes the search information to be extracted.

Specifically, the search result list creating system 200 may receive a maximum click cost associated with the advertising fee from the advertiser and calculate the CCI size by reflecting an advertising management point into the maximum click cost. In this instance, the advertiser pays the advertising fee according to the CPC rule. Specifically, the search result list creating system 200 may change data into the advertising management point, and calculate the CCI size with respect to each search information by multiplying the maximum click cost and the calculated advertising management point. In this instance, the data is created in association with the search information during a predetermined period of time. As described above, the advertising management point may be arbitrarily set by an operator of the present system considering operational results accomplished by particular search results during a previous period of time. The search result list creating system 200 may calculate the advertising management point by considering at least one of a click rate and a CTR with respect to each search information. In this instance, the click rate is acquired by dividing a number of clicks by a number of displays.

Also, in operation S510, the search result list creating system 200 may determine an available price range for each keyword category, and may induce the advertiser to enter the maximum click cost within the available price range which is determined for a keyword category of the keyword. Through the above process, the search result list creating system 200 may maintain a price of a keyword purchased for each category to a certain level. For example, the search result list creating system 200 may appropriately guarantee the benefits of a system operator by preventing the advertiser from entering the maximum click cost at an extremely low price for a category including popular keywords.

In operation S520, the search result list creating system 200 searches the database 210 for search information of a keyword corresponding to a search keyword, when the search keyword is received. Operation S520 is a process of retrieving search information corresponding to the search keyword in response to a search request generated when a searcher enters the search keyword. When retrieving the search information, the search result list creating system 200 may identify a keyword, which exactly matches the search keyword or includes the search keyword, from the database 210 and search the database 210 for search information corresponding to the identified keyword.

In operation S530, the search result list creating system 200 classifies the retrieved search information into any one of a plurality of area groups by using the CCI information. Operation S530 is a process of determining a display area to display the search listing associated with the search information. In operation S530, the search result list creating system 200 may classify each search information into one particular group area according to the CCI size of the search information, and display the classified search information on a display area allocated to the group area.

Figure 6:
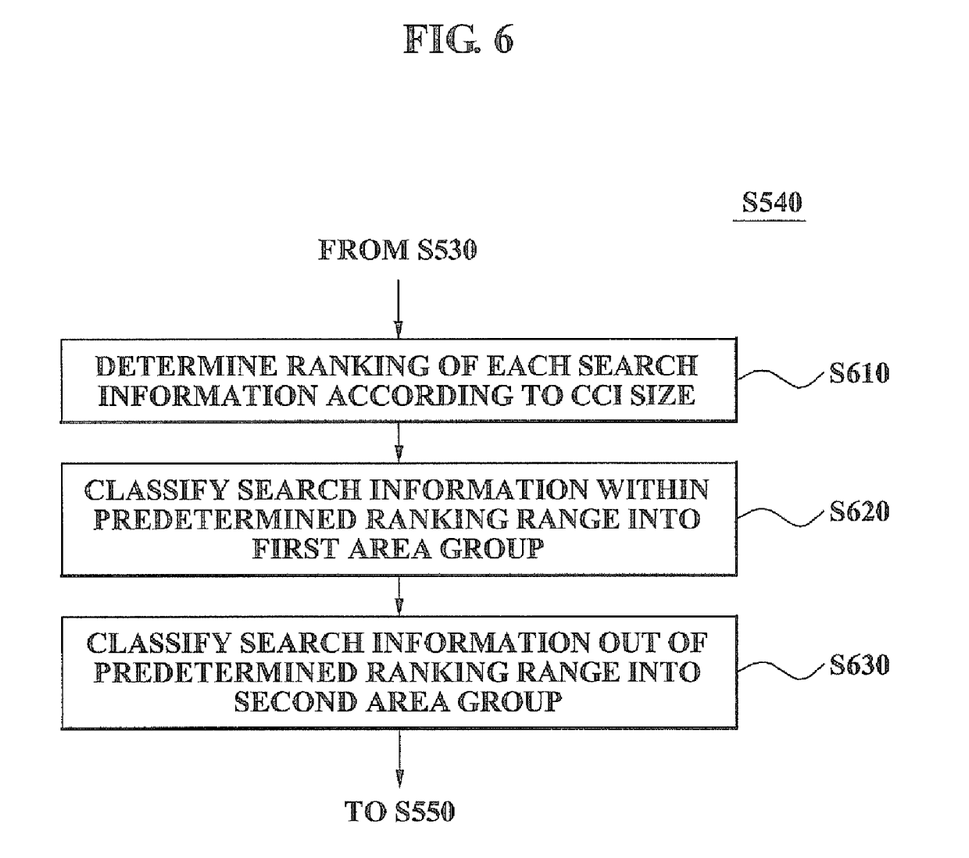
FIG. 6 is a flowchart illustrating an example of classifying search information into a group according to an exemplary embodiment of the present invention.

FIG. 6 is a flowchart illustrating an example of classifying search information into a group according to an exemplary embodiment of the present invention.

In operation S610, the search result list creating system 200 determines a ranking of each search information according to a CCI size included in the CCI information. Operation S610 is a process of comparing a CCI size with another CCI size, and assigning a greater ranking to search information with a comparatively greater CCI size. In this instance, the CCI size is calculated by multiplying the maximum click cost and the advertising management point. When determining the ranking, the search result list creating system 200 may assign a higher ranking to search information for which the advertiser enters a greater maximum click cost or a greater advertising management point is set due to good results acquired during the previous period of time.

In operation S620, the search result list creating system 200 classifies search information within a predetermined ranking range into a first area group. Operation S620 is a process of identifying search information within the predetermined ranking range, and classifying the identified search information into one particular area group. Referring to FIG. 3, search information 'flower delivery flower mall', 'recommendation flower delivery', and 'flower119 flower delivery' within the top three are classified into the first area group. The search information classified into the first area group may be displayed to the searcher in a comparatively upper display area among a plurality of display areas. Specifically, the search result list creating system 200 may classify search information, which is determined to have a greater CCI size and thus deserves to be separately classified, into the first area group.

In operation S630, the search result list creating system 200 classifies search information out of the predetermined ranking range into a second area group which is different from the first area group. Operation S630 is a process of identifying search information out of the predetermined ranking range into another area group. Referring to FIG. 3, a plurality of search information, 'green topia', 'joa flower delivery', 'Korea flower net', and the like, out of the top three, are classified into the second area group.

Referring again to FIG. 5, in operation S540, the search result list creating system 200 creates the search result list by sorting the classified search information according to a predetermined sorting rule. Operation S540 is a process of sorting search information according to an independent sorting rule for each area group, and creating a list of the sorted search information.

For example, when a fixed-type sorting rule is determined as the sorting rule with respect to at least one of the first area group and the second area group, the search result list creating system 200 may create the search result list by sorting the search information, classified into the first area group or the second area group, according to a descending series based on the CCI size.

Also, when a rolling type sorting rule is determined as the sorting rule with respect to at least one of the first area group and the second area group, the search result list creating system 200 may create the search result list by randomly sorting the search information, classified into the first area group or the second area group.

Also, when a sorting algorithm utilization rule is determined as the sorting rule, the search result list creating system 200 may create the search result list by sorting the search information classified into the second area group according to the sorting algorithm. In this instance, the sorting algorithm is created by considering at least one of a popularity of the search information and a relation between the search information and the keyword. Specifically, the sorting algorithm may be arbitrarily created by an operator of the present system analyzing a current sorting status of search information, providing results of keyword advertising, and the like, over a predetermined previous period of time.

Referring again to FIG. 1 a search result list, which is created by sorting search information according to the fixed-type sorting rule, is displayed on the display area 'power link' allocated to the first area group. Also, another search result list, which is created by sorting search information according to the sorting algorithm, is displayed on the display area 'beads site' allocated to the second area group.

In operation S550, the search result list creating system 200 simultaneously displays a plurality of search result lists on a plurality of display areas allocated to a plurality of area groups respectively, when the search keyword is received. In this instance, the plurality of search result lists is created for each area group. Operation S550 is a process of simultaneously displaying the plurality of search results, which are created by sorting search information classified into each area group according to an individual sorting rule, on a search result view in response to a search request. In the present exemplary embodiment, the search result list associated with the first area group may be displayed on a comparatively upper display area, and another search result list associated with the second area group may be displayed in a comparatively lower display area than the search result list associated with the first area group.

In operation S560, when a searcher clicks the search listing associated with the search information of the search result list, the search result list creating system 200 charges an advertiser of the search information with an advertising fee. Operation S560 is a process of charging the advertiser with the advertising fee according to the CPC rule. Accordingly, it is possible to charge the advertiser with a reasonable advertising fee in proportion to a number of times that the searcher is substantially connected to a website of the advertiser.

Accordingly, a method of creating a search result list according to the present invention may differ from a conventional method of providing an individual database for each display area and thereby effectively managing search information, and may enroll a keyword in a single database according to one keyword purchase and thereby display the search listing on a plurality of display areas.

Also, according to the present invention, it is possible to display an advertiser's search listing on a plurality of display areas while organically changing the plurality of display areas and thereby enable the advertiser to effectively display and manage the search information according to a marketing strategy.

Also, according to the present invention, it is possible to determine a location of search listing associated with the search information in a search result list according to a predetermined algorithm considering various elements, and thereby solve a problem, such as an increase in an advertising fee, which occurs from a conventional search information location determining method using only a maximum click cost.

Also, according to the present invention, it is possible to reduce system configuration/maintenance cost since a keyword advertising provider does not need to provide a database for each display area, and also does not need additional efforts, such as business or marketing, for each display area.

The search result list creating method according to the above-described exemplary embodiment of the present invention may be recorded in computer-readable media including program instructions to implement various operations embodied by a computer. The media may also include, alone or in combination with the program instructions, data files, data structures, and the like; Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The described hardware devices may be configured to act as one or more software modules in order to perform the operations of the above-described exemplary embodiments of the present invention.

According to the present invention, there may be provided a method and system for creating a search result list, which can differ from a conventional method and system of providing an individual database for each display area and thereby effectively managing search information, and can enroll a keyword in a single database according to one keyword purchase and thereby display the search listings on a plurality of display areas.

Also, according to the present invention, there may be provided a method and system for creating a search result list, which can display an advertisers' search listings on a plurality of display areas while organically changing the plurality of display areas, and thereby enable the advertiser to effectively display and manage the search information according to a marketing strategy.

Also, according to the present invention, there may be provided a method and system for creating a search result list, which can reduce system configuration/maintenance cost since a keyword advertising provider does not need to provide a database for each display area, and also does not need additional efforts, such as business and marketing, for each display area.

Also, according to the present invention, there may be provided a method and system for creating a search result list, which can display a plurality of search result lists on a plurality of display areas respectively, and thereby enable a searcher to readily access various types of search information and also give an advertiser more opportunities to display search listings via one keyword purchase.

Also, according to the present invention, there may be provided a method and system for creating a search result list, which can combine display areas, for example, 'power link' and 'beads site', into a single system and thereby improve a convenience in a keyword enrollment and enable a common utilization of a database.

Also, according to the present invention, there may be provided a method and system for creating a search result list, which can put a difference one display rule in an upper display area and another display rule in a lower display area, and thereby encourage healthy competition among companies, and sort search information by appropriately mixing a paid listing rule and a paid inclusion rule.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that relative terms are intended to encompass different orientations of the device in addition to the orientation depicted in the Figures.

Moreover, it will be understood that although the terms first and second are used herein to describe various features, elements, regions, layers and/or sections, these features, elements, regions, layers and/or sections should not be limited by these terms. These terms are only used to distinguish one feature, element, region, layer or section from another feature, element, region, layer or section. Thus, a first feature, element, region, layer or section discussed below could be termed a second feature, element, region, layer or section, and similarly, a second without departing from the teachings of the present invention.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Further, as used herein the term "plurality" refers to at least two elements. Additionally, like numbers refer to like elements throughout.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. Section 112, sixth paragraph, unless the element is expressly recited using the phrase "means for" or, in the case of a method claim, the element is recited using the phrase "step for."

What is claimed is:

1. A computer-implemented method of creating a keyword search result list for multiple display areas, the method comprising the steps of:
   maintaining a single database for multiple display areas, the database storing keyword advertisements, each said keyword advertisement being associated with an advertiser and at least one search keyword, the keyword advertisement including a search listing and a rank index information wherein the rank index information is determined based, at least in part, upon a bid amount received from an advertiser and at least one of an average click rate and a click through rate (CTR) for a predetermined time period with respect to the keyword advertisement;
   searching the database for one or more keyword advertisements corresponding to a search keyword in response to a search request received from a searcher;
   identifying one or more keyword advertisements having search keyword generating a match with the search request;
   classifying the identified one or more keyword advertisements into a plurality of groups associated with a plurality of display areas by using the rank index information;
   creating a search result list by arranging the classified keyword advertisements for display, each of said plurality of display areas including one or more of said classified keyword advertisements; and
   displaying the search result list in response to the search request, each of the plurality of display areas being displayed separately from each other,
   wherein the steps of classifying and of creating are performed by a server including a processor, and some of the classified keyword advertisements are arranged in a random order and the other of the classified keyword advertisements are arranged according to a predetermined sorting rule.

2. The method of claim 1, wherein the step of displaying comprises the step of:
   charging an advertiser of the keyword advertisement with an advertising fee when the searcher clicks the displayed search listing of the search result list,
   wherein the advertising fee is calculated by using a maximum click cost entered from the advertiser.

3. The method of claim 1, wherein the predetermined sorting rule is created by considering at least one of a popularity of the keyword advertisement and a relation between the keyword advertisement and the search keyword.

4. The method of claim 1, wherein the step of classifying comprises the steps of:
- classifying the identified keyword advertisements within a first predetermined range of the ranks into a first display area; and
- classifying the identified keyword advertisements within a second predetermined range of the ranks into a second display area, wherein the second display area is displayed separately from the first display area.

5. The method of claim 1, wherein the rank index information is click choice index (CCI) information and the CCI information is determined based, at least in part, upon the bid amount and at least one of an average click rate and a click through rate (CTR) for a predetermined time period with respect to the keyword advertisement, wherein the click rate is calculated by dividing the number of clicks by the number of displays.

6. The method of claim 1, further comprising the step of updating the CCI information stored in the database.

7. The method of claim 1, further comprising the steps of:
- determining price ranges of the bid amount, which allows the keyword advertisements to be classified into each display area for display; and
- providing the price ranges in association with each of the display areas to advertisers.

8. One or more storage media having stored thereon a computer program that, when executed by one or more processors, causes the one or more processors to perform acts including:
- maintaining a single database for multiple display areas, the database storing keyword advertisements, each said keyword advertisement being associated with an advertiser and at least one search keyword, the keyword advertisement including a search listing and a rank index information wherein the rank index information is determined based, at least in part, upon a bid amount received from an advertiser and at least one of an average click rate and a click through rate (CTR) for a predetermined time period with respect to the keyword advertisement;
- searching the database for keyword advertisements corresponding to a search keyword in response to a search request received from a searcher;
- identifying one or more keyword advertisements having search keyword generating a match with the search request;
- classifying the identified one or more keyword advertisements into a plurality of groups associated with a plurality of display areas by using the rank index information;
- creating a search result list by arranging the classified keyword advertisements for display, each of said plurality of display areas including one or more of said classified keyword advertisements; and
- displaying the search result list in response to the search request, each of the plurality of display areas being displayed separately from each other,
- wherein some of the classified keyword advertisements are arranged in a random order and the other of the classified keyword advertisements are arranged according to a predetermined sorting rule.

9. A system for creating a search result list, the system comprising:
- a memory storing a single database for multiple display areas, the database storing keyword advertisements, each said keyword advertisement being associated with an advertiser and at least one keyword advertisement, the keyword advertisement including a search listing and a rank index information wherein the rank index information is determined based, at least in part, upon a bid amount received from an advertiser and at least one of an average click rate and a click through rate (CTR) for a predetermined time period with respect to the keyword advertisement;
- one or more processors for processing data;
- a search component configured to search the database for keyword advertisements corresponding to a search keyword in response to a search request received from a searcher;
- a group classifier configured to classify one or more keyword advertisements into a plurality of groups associated with a plurality of display areas by using the rank index information; and
- a list creator configured to create a search result list by arranging the classified keyword advertisements for display, each of said plurality of display areas including one or more of said classified keyword advertisements,
- wherein each of said plurality of display areas are to be displayed separately from each other, and some of the classified keyword advertisements are arranged in a random order and the other of the classified keyword advertisements are arranged according to a predetermined sorting rule.

10. The method of claim 9, wherein the searched keyword advertisements within a first predetermined range of the ranks is classified into a first display area and the searched keyword advertisements within a second predetermined range of the ranks is classified into a second display area, wherein the second display area is displayed separately from the first display area.

11. The method of claim 9, wherein the rank index information is click choice index (CCI) information and the CCI information is determined based, at least in part, upon the bid amount and at least one of an average click rate and a click through rate (CTR) for a predetermined time period with respect to the, wherein the click rate is calculated by dividing the number of clicks by the number of displays.

12. The method of claim 11, wherein the stored CCI information is updated periodically.

* * * * *